(12) United States Patent
Lee et al.

(10) Patent No.: US 8,390,470 B2
(45) Date of Patent: Mar. 5, 2013

(54) DISPLAY DEVICE

(75) Inventors: Wang Gun Lee, Pyeongtaek-si (KR);
Dong Hyun Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 706 days.

(21) Appl. No.: 12/578,250

(22) Filed: Oct. 13, 2009

(65) Prior Publication Data
US 2010/0156657 A1    Jun. 24, 2010

(30) Foreign Application Priority Data

Dec. 24, 2008 (KR) .................. 10-2008-0133499
Apr. 21, 2009 (KR) .................. 10-2009-0034521

(51) Int. Cl.
*G08B 5/36* (2006.01)
(52) U.S. Cl. .................. 340/815.75; 362/608
(58) Field of Classification Search ............... 340/815.4, 340/815.45, 815.75; 362/600, 602, 605, 362/608, 609, 615, 806, 811
See application file for complete search history.

(56) References Cited

U.S. PATENT DOCUMENTS

| 5,861,815 A | 1/1999 | Wernig |
| 2002/0190975 A1* | 12/2002 | Kerr .................. 345/211 |
| 2005/0052586 A1 | 3/2005 | Ogino |
| 2006/0203136 A1 | 9/2006 | Testin et al. |

FOREIGN PATENT DOCUMENTS

| JP | 2006-030322 A | 2/2006 |
| JP | 2006-261036 A | 9/2006 |
| KR | 10-2005-00113681 A | 12/2005 |
| WO | WO 2007/026285 A1 | 3/2007 |
| WO | WO 2008/065614 A1 | 6/2008 |
| WO | WO-2008/120879 A1 | 10/2008 |

* cited by examiner

*Primary Examiner* — Thomas Mullen
(74) *Attorney, Agent, or Firm* — Birch, Stewart, Kolasch & Birch, LLP

(57) ABSTRACT

A display device is provided. The display includes a display main body, a light source, a diffusion part, and a transmission part. The display main body includes a display module and a cabinet protecting the display module. The light source generates light according to an operating state of the display main body. The diffusion part receives the light from the light source and includes a reflective surface oblique to an incident direction of the light. The transmission part includes an optical imaging part on which the light diffused from the diffusion part is projected and transmits the light to the outside at one side of the diffusion part.

14 Claims, 20 Drawing Sheets

DISPLAY DEVICE

CROSS-REFERENCE TO RELATED APPLICATIONS

The present application claims priority under 35 U.S.C. 119 and 35 U.S.C. 365 to Korean Patent Application No. 10-2008-0133499 (filed on Dec. 24, 2008) No. 10-2009-0034521 (filed on Apr. 21, 2009) which is hereby incorporated by reference in its entirety.

BACKGROUND

The present disclosure relates to a display device, and more particularly, to a display device indicating operation thereof.

Generally, display devices are devices that display images. Recently, a wide range of flat display devices implemented in flat, two-dimensional forms have been introduced.

The display devices include a display main body having a display module for displaying an image and a cabinet for protecting the display module. The display main body may be seated on a seating member such as a living room cabinet, or installed on a ceiling or wall for use.

SUMMARY

Embodiments provide a display device that enables a user to easily perceive the operating state thereof, by selectively emitting light to the outside according to the operating state of the display main body.

In one embodiment, a display device includes: a display main body comprising a display module and a cabinet protecting the display module; a light source generating light according to an operating state of the display main body; a diffusion part to which the light from the light source is incident, and comprising a reflective surface oblique to an incident direction of the light; and a transmission part disposed at a side of the diffusion part, and comprising an optical imaging part providing a predetermined region through which the light that is diffused from the diffusion part is projected, the transmission part transmitting the light externally.

In another embodiment, a display device includes: a display module; a cabinet protecting the display module; a light source generating light according to an operating state of the display device; a diffusion part comprising an incident surface to which the light from the light source is incident, a reflective surface oblique to an incident direction of the light, and a projection surface projecting the light reflected by the reflective surface in a direction crossing the incident direction; and a transmission part contacting the projection surface, transmitting the light projected from the projection surface outward, and comprising an optical imaging part on at least a portion of which the transmitted light is projected, wherein the portion of the optical imaging part on which the light is projected is moved from one point to another point of the optical imaging part according to time.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to a display device according to embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
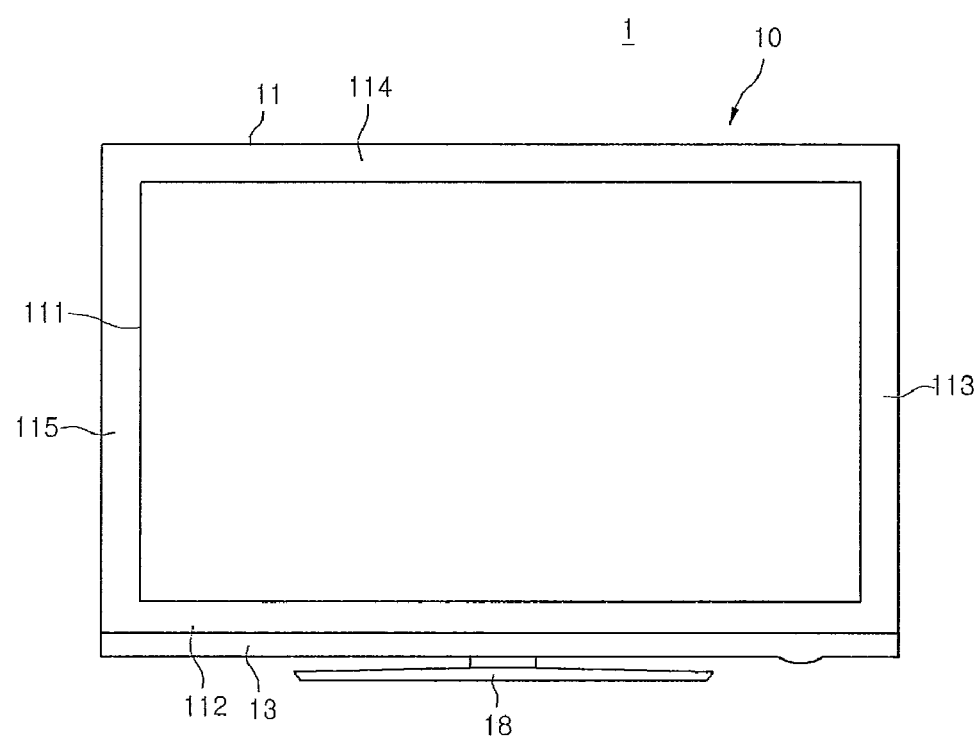
FIG. 1 is a front view of a display device according to a first embodiment.

FIG. 1 is a front view of a display device according to a first embodiment.

Referring to FIG. 1, a display device 1 includes a display main body 10 displaying images, and a stand 18 supporting the display main body 10. When the display main body 10 is installed on a wall or a ceiling, the stand 18 may be substituted with a supporting device that is installed on the wall or the ceiling.

The display main body 10 includes a display module (not shown) displaying images, and a front cabinet 11 and a rear cabinet (not shown) that protect the display module and form the external shape of the display main body 10.

In the front cabinet 11, an opening part 111 is formed to display images from the display module to the outside. The front cabinet 11 includes four frames 112 to 115. The frames 112 and 115 form the four sides of the front cabinet 11 having a rectangular shape.

In this embodiment, it has been described that the opening part 111 is formed in the front cabinet 11 to display images. However, without the separate opening part, the front cabinet 11 may be formed of a transparent material through which images may be transmitted, so that the front cabinet 11 may be formed in a single plate shape.

The display device 1 includes a light source 16 (refer to FIG. 3) emitting light according to an operating state of the display main body 10, and a deco frame 13 allowing light emitted from the light source 16 to be transmitted in the downward direction of the display main body 10 through refraction and diffusion.

Hereinafter, detailed configurations of the deco frame 13 and the light source 16 will be described.

Figure 2:
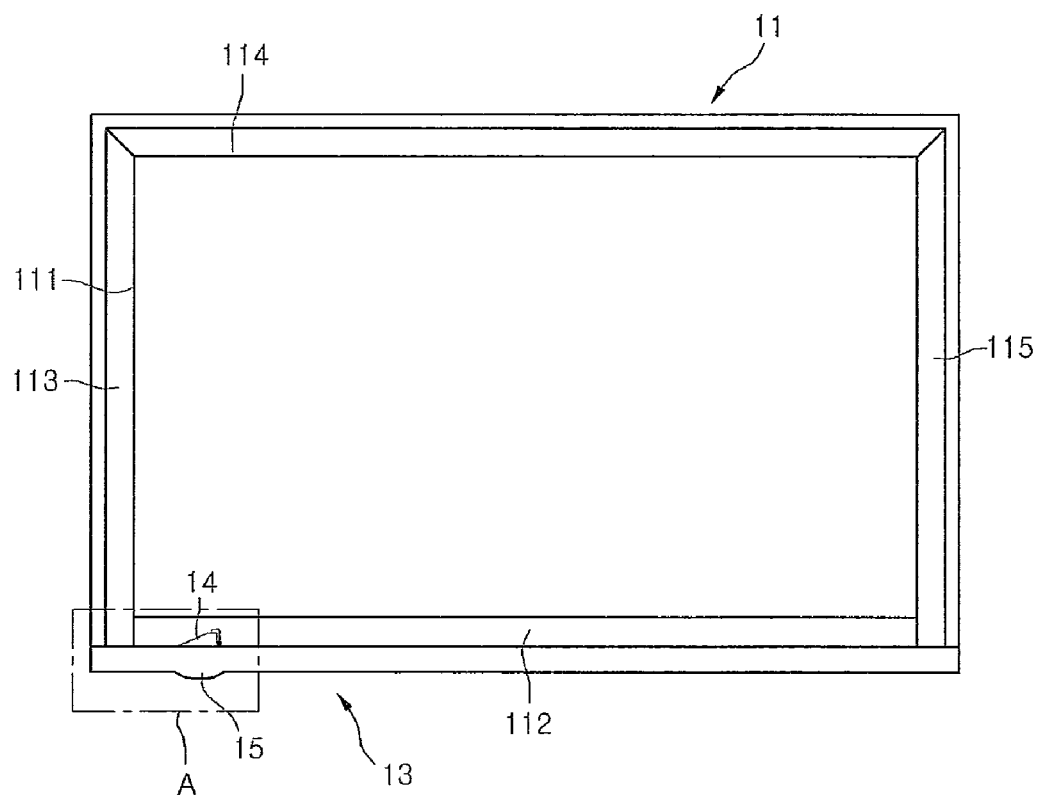
FIG. 2 is a rear view of a front cabinet according to the first embodiment.
Figure 3:
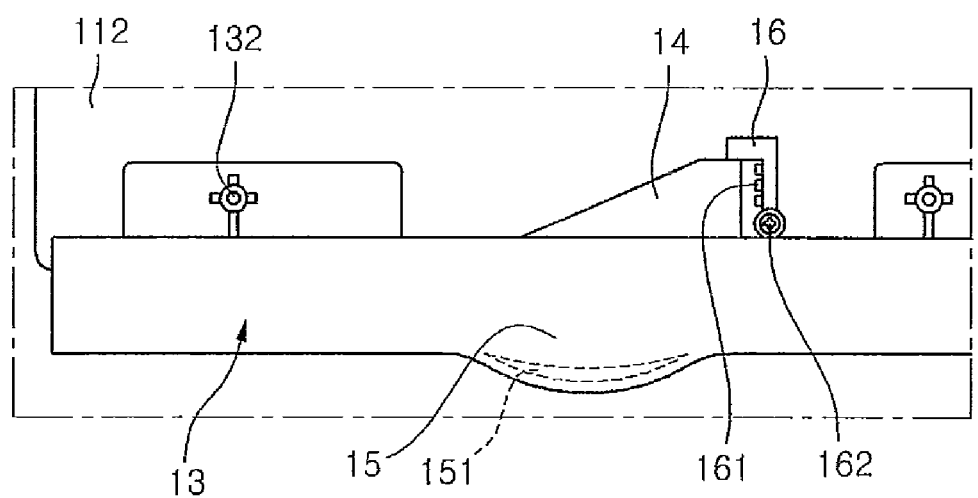
FIG. 3 is a magnified view of a region "A" of FIG. 2.
Figure 4:
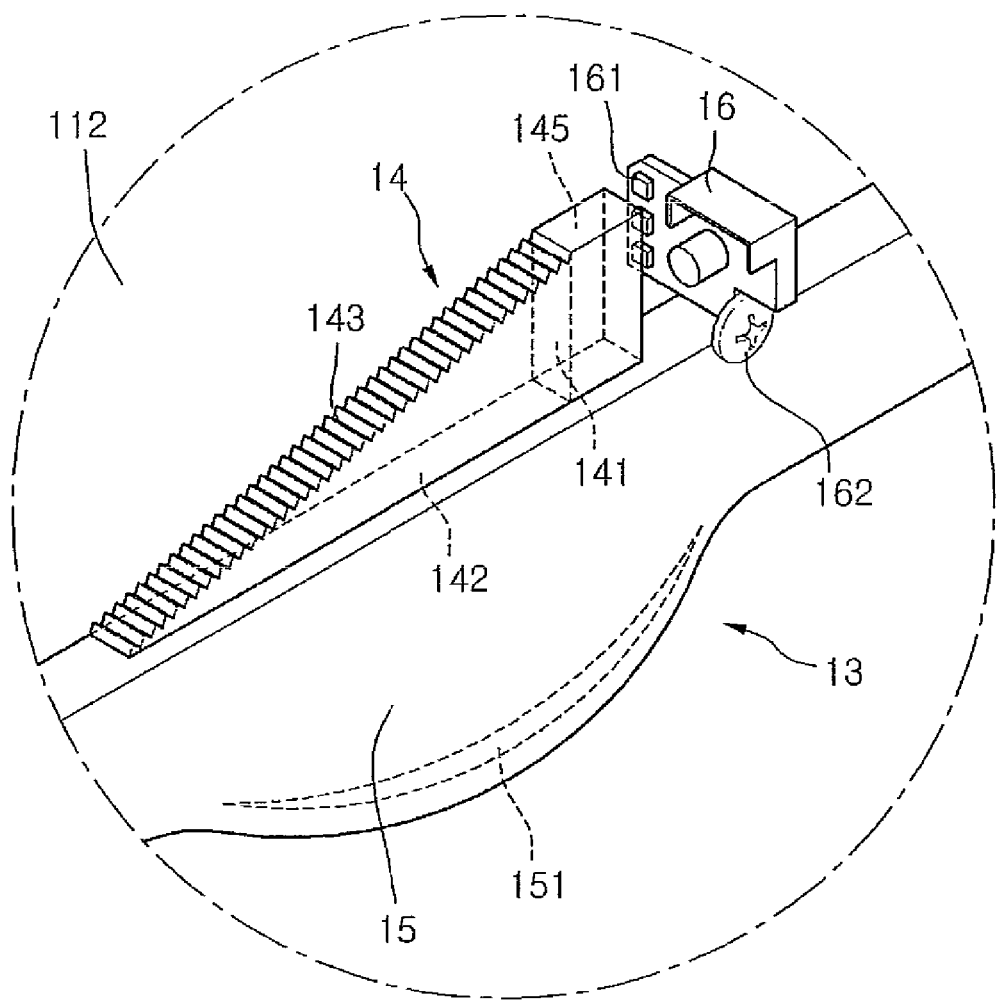
FIG. 4 is a magnified perspective view of a region "A" of FIG. 2.

FIG. 2 is a rear view of a front cabinet according to the first embodiment. FIG. 3 is a magnified view of a region "A" of FIG. 2. FIG. 4 is a magnified perspective view of a region "A" of FIG. 2.

Referring to FIGS. 2 through 4, the deco frame 13 is formed of a light-transmissive material that transmits light generated from the light source 16, and is provided at the side of the first frame 112.

The deco frame 13 may include a diffusion part 14 reflecting and diffusing incident light from one direction to another direction, a transmission part 15 through which the reflected light from the diffusion part 14 is transmitted to the outside, and a fixing part 132 that is fixed at the front cabinet 11.

In this embodiment, although it has been described that the deco frame 13 includes the diffusion part 14 and the transmission part 15, the diffusion part 14 and the transmission part 15 may be configured to be formed independently from the deco frame 13.

The diffusion part 14 may be integrally formed with the deco frame 13, and may have a trapezoid shape with one tilted side or a right-triangular shape.

An incident surface 141 to which light from the light source 16 is incident is formed in the diffusion part 14. A projection surface 142 perpendicular to the incident surface 141 is formed to project the reflected light in the diffusion part 14.

A reflective surface 143 is formed at the other side of the diffusion part 14 to reflect the light incident through the incident surface 141 to the projection surface 142.

That is, one edge of the incident surface 141 and one edge of the projection surface 142 may contact each other. The other edge of the incident surface 141 and one edge of the reflective surface 143, and the other edge of the projection surface 142 and the other edge of the reflective surface 143 may contact each other, respectively. The sectional shape of the diffusion part 14 may be a right-triangular shape as an example.

The reflective surface 143 is formed oblique to an incident direction of light at a certain angle to reflect the light incident through the incident surface 141. A plurality of grooves is formed in the reflective surface 143 to reflect the light to the projection surface 142 at a uniform brightness. That is, through the plurality of grooves formed in the reflective surface 143, the incident light may be diffusedly reflected, and simultaneously may be reflected and transmitted to the projection surface 142 at a uniform brightness.

The diffusion part 14 may further include an extension part 145 extending from the light source 16 parallelly to the incident surface 141. When the incident surface 141 is spaced from the light source 16 by a certain distance, the extension part 145 is provided between the incident surface 141 and the light source 16 to provide an optical path through which light emitted from the light source 16 may be irradiated to the incident surface 141. Accordingly, optical loss caused by a spaced distance between the incident surface 141 and the light source 16 may be reduced.

The projection surface 142 may have an area greater than that of the incident surface 141. Accordingly, when light incident to the incident surface 141 is transmitted to the projection surface 142, the light incident to the incident surface 141 may be diffused by an area difference between the projection surface 142 and the incident surface 141.

The transmission part 15 is provided under the projection surface 142 to transmit the projected light from the projection surface 142 to the outside. The transmission part 15 may be formed of a transparent material, and may be integrally formed with the diffusion part 14. The transmission part 15 may be formed in various shapes such as a plane or an arc.

Light diffused at the diffusion part 14 and irradiated to the transmission part 15 is transmitted to the outside through the transmission part 15.

The transmission part 15 may include an optical imaging part 151 where light is collected. The optical imaging part 151 may have an uneven diffusion surface to easily diffuse the light in multiple directions.

When the deco frame 13 is combined with the front cabinet 11, the diffusion part 14 is located in the display main body 10, and the transmission part 15 is located outside the display main body 10 to be exposed to the outside.

The light source 16 is located at the side of the incident surface 143. The light source 16 may be fixed to the diffusion part 14 or the front cabinet 11 through a coupling member 162. The light source includes at least one light emitting device 161 that generates light according to the operating state of the display main body 10.

The light emitting device 161 may be located opposite to the incident surface 143 or the extension part 145, so that the optical path of the light generated from the light emitting device 161 may be perpendicular to the incident surface 313. Examples of the light emitting devices 161 may include a Light Emitting Diode (LED) or a lamp.

The light emitting device 161 may generate light having various colors and brightness when the display main body 10 is in the on or standby state. When a plurality of light emitting devices 161 is provided, the plurality of light emitting devices 161 may be light emitting devices having different colors.

In this embodiment, although it has been described that the deco frame 13 is provided using a member different from the front cabinet 11, the deco frame 13 and the front cabinet 11 may be integrally formed of a light-transmissive material.

Hereinafter, a process in which the light emitted from the light source 16 is transmitted to the outside through the diffusion part 14 and the transmission part 15 will be described in detail.

Figure 5:
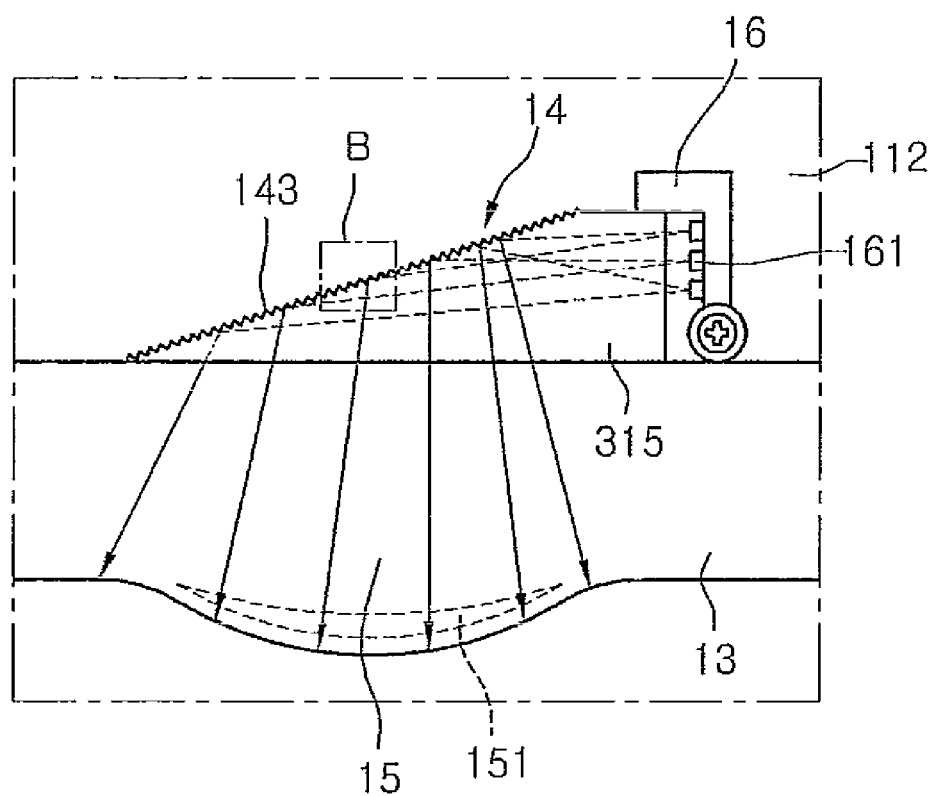
FIG. 5 is a view illustrating light projected in the display device according to the first embodiment.
Figure 6:
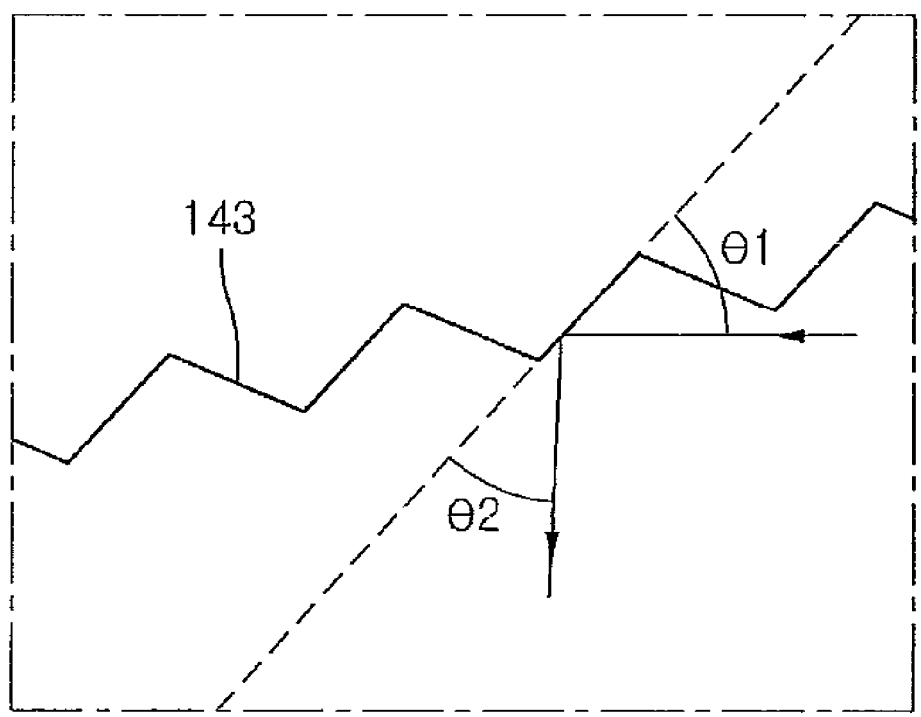
FIG. 6 is a view illustrating a reflection process of light in FIG. 5.

FIG. 5 is a view illustrating light projected in the display device according to the first embodiment, and FIG. 6 is a view illustrating a reflection process of light in FIG. 5.

Referring to FIGS. 5 and 6, when emitted from the light emitting device 161 of the light source 16, the light is incident to the incident surface 141 through the extension part 145. In this case, the light generated from the light emitting device 16 is incident to the incident surface 141 perpendicular to the incident surface 141.

After the incident light is incident to the reflective surface 143, the light is reflected at a certain angle. In this case, since the reflective surface 143 is an interface between the diffusion part 14 and air that are different media, the incident light to the reflective surface 143 is reflected partially or totally according to the incident angle of the light.

That is, by Snell's Law, the light incident to the reflective surface at an incident angle θ1 is partially or totally reflected at a reflection angle θ2 identical to the incident angle θ1.

Here, when the incident angle θ1 is identical to or less than a critical angle θc determined by the refractive indices of air and the diffusion part 14, the incident light is totally reflected by the reflective surface 143.

In this case, the optical path of the light incident in a perpendicular direction to the incident surface 141, that is, in the horizontal direction is reflected by the reflective surface 143 toward the downward direction of the display main body 10.

That is, the light source 16 irradiates light to the side of the diffusion part 14, and the irradiated light is reflected and diffused by the diffusion part 14 in the downward direction of the display main body 10.

The light projected on the projection surface 142 is transmitted through the transmission part 15, and is collected on the optical imaging part 151 formed in the transmission part 15 to be diffused to the outside in various directions.

Since the light is incident to the incident surface 141 having a relatively small area, and is outwardly diffused through the projection surface 142 and the transmission part 15 that have relatively broad areas, this embodiment has an advantage in that a small amount of light by a light emitting device can be irradiated to a broad area.

As the diffusion part 14 reflects and projects incident light to the projection part 15, there is an advantage in that the internal design of the display main body 10 is not restricted to the direction of light emitted from the light source 16.

Figure 7:
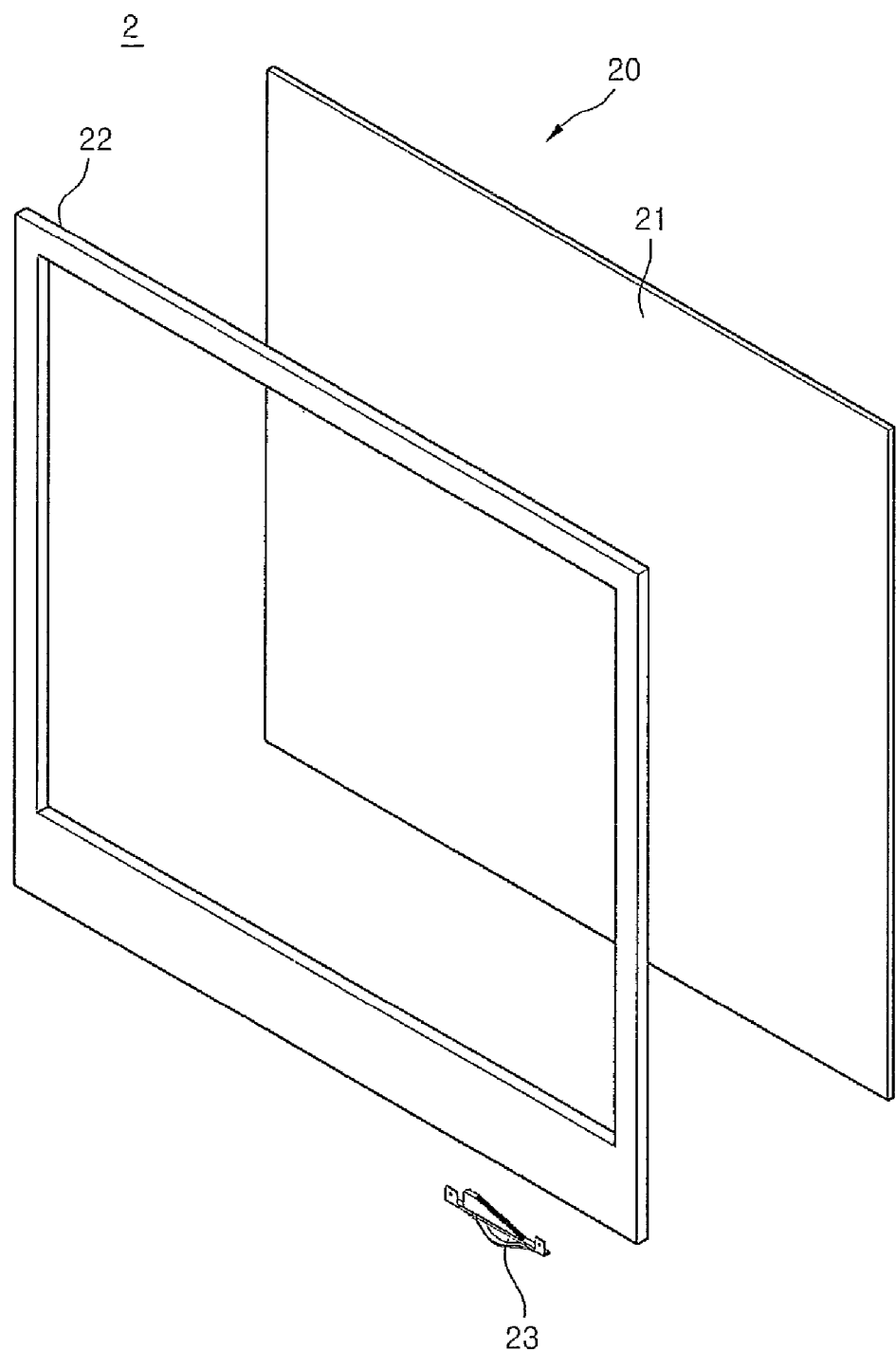
FIG. 7 is an exploded perspective view of a display device according to a second embodiment.

FIG. 7 is an exploded perspective view of a display device according to a second embodiment.

The configuration of the second embodiment is identical to that of the first embodiment, except that the configurations of front cabinets and deco frames are different from each other. Accordingly, only featured parts of the second embodiment will be described hereinafter.

Referring to FIG. 7, a display main body 20 of a display device 2 according to this embodiment includes a front panel 21 and a panel fixing part 22 fixed on the rear surface of the front panel 21.

The front panel 21 may constitute the front, outer shape of the display device 2, and be formed of a transparent plate-shaped material that does not define an opening part to display images. When the front panel 21 is provided in a transparent plate shape, the front panel 21 may be formed of a material having certain strength and transparency properties, such as tempered glass or a transparent resin member.

A panel fixing part 22 that provides a coupling position of the front panel 21 and a display module (not shown) or a rear cabinet (not shown) may be fixed on the rear surface of the front panel 21. The panel fixing part 22 may have a rectangular shape with an open interior, and form a part of the side surfaces of the display device 2.

In this embodiment, the front panel 21 including the panel fixing part 22 may be referred to as a front cabinet that protects the front surface of the display module.

The display device 2 includes a deco frame 23 that is fixed on the front cabinet. As an example, the deco frame 23 may be provided adjacent to a power switch of the display device 2.

Hereinafter, the configuration of the deco frame 23 will be described in detail.

Figure 8:
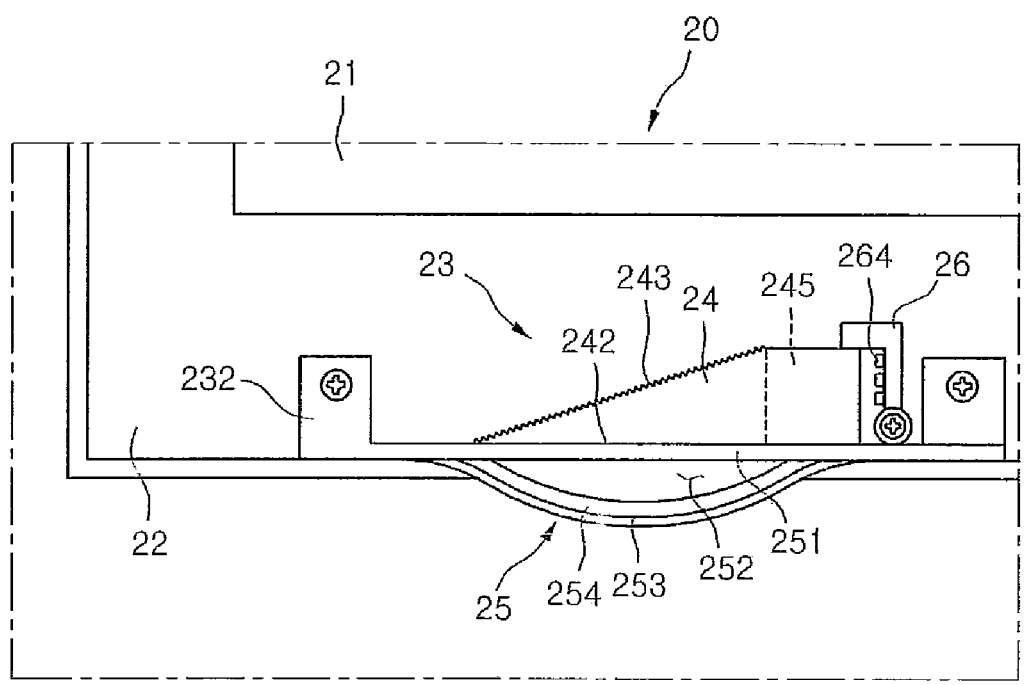
FIG. 8 is a rear view of a front cabinet according to the second embodiment.
Figure 9:
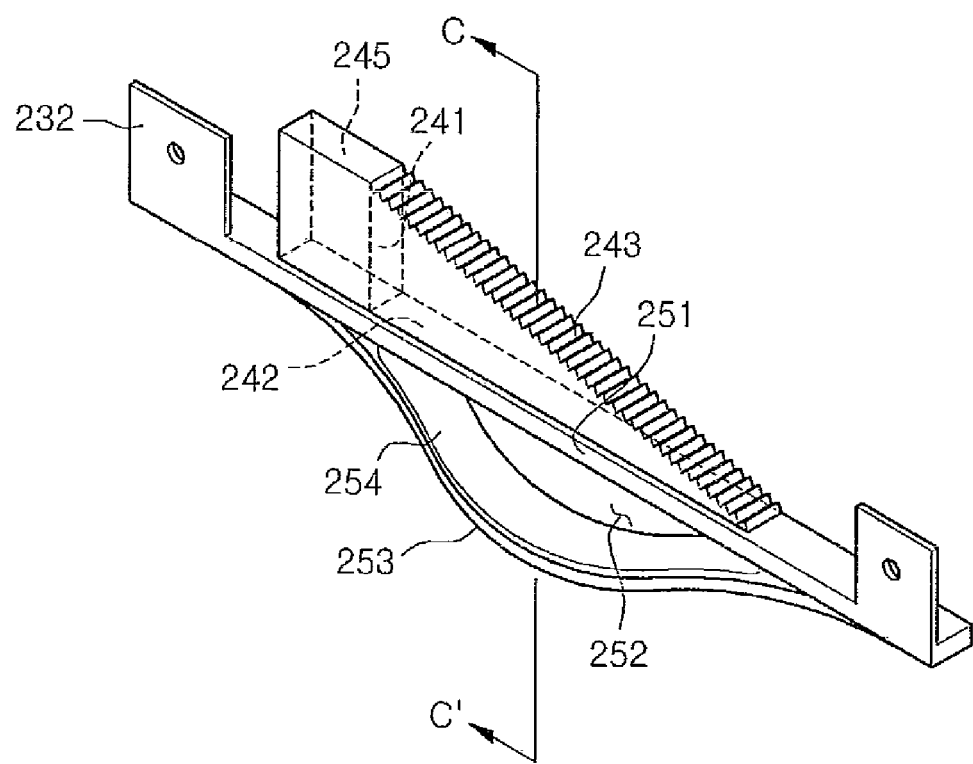
FIG. 9 is a perspective view of a diffusion part and a transmission part according to the second embodiment.
Figure 10:
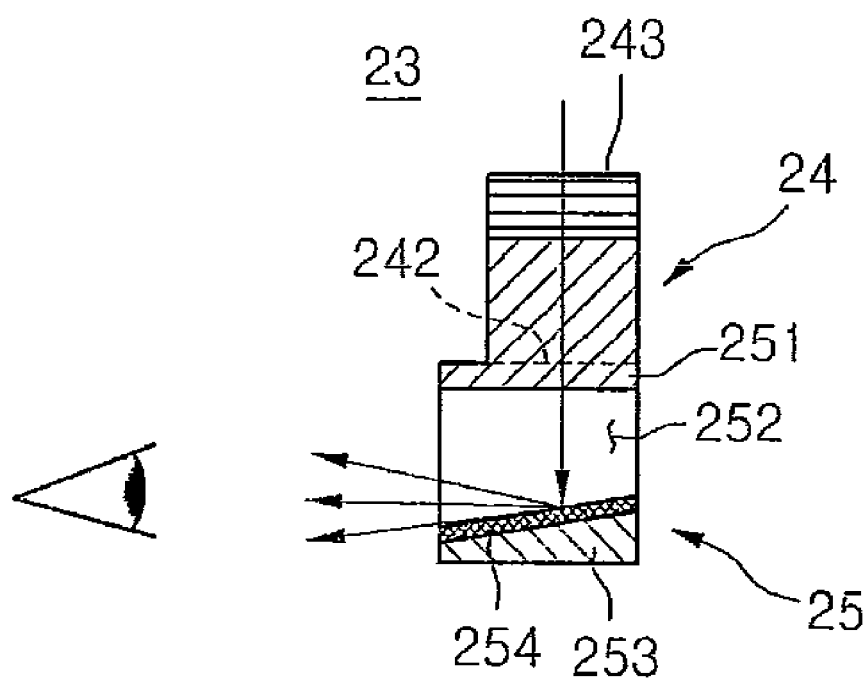
FIG. 10 is a sectional view taken along line C-C of FIG. 9 illustrating a traveling direction of light.

FIG. 8 is a rear view of a front cabinet according to the second embodiment. FIG. 9 is a perspective view of a diffusion part and a transmission part according to the second embodiment. FIG. 10 is a sectional view taken along line C-C' of FIG. 9 illustrating a traveling direction of light.

Referring to FIGS. 8 through 10, the deco frame 23 includes a diffusion part 24 diffusing and reflecting light emitted from a light emitting device 261 of a light source 26, a transmission part 25 transmitting the light diffused at the diffusion part 24, and a fixing part 232 fixed to the panel fixing part 22.

The diffusion part 24 includes an incident surface 241, a projection surface 242, a reflective surface 243, and an extension part 245. Since the configuration of the diffusion part 24 is identical to that of the first embodiment, detailed description thereof will be omitted.

The transmission part 25 is provided under the diffusion part 24, and includes a first transmission layer 251 where light projected from the projection surface 242 is incident and a second transmission layer 252 under the first transmission layer 251, and a diffusion part 253 where the light transmitted through the first and second transmission layers 251 and 252 is diffused.

The first transmission layer 251 may be formed of a material identical to the diffusion part 24. The second transmission layer 252 is formed through a portion of the transmission part 25. That is, when light is transmitted, the first transmission layer 251 is provided using the same material as the diffusion part 24, and the second transmission layer 252 is provided using air as a medium.

The diffusion part 253 is located under the second transmission layer 252, and includes an optical imaging part 254 formed to cross an optical path of light transmitted through the first and second transmission layers 251 and 252. For example, the optical imaging part 254 may be plated or deposited with a metal material such as aluminum. Also, the optical imaging part 254 may be formed oblique to the forward direction of the display device 2 to diffuse the light in the forward direction of the display device 2.

In this embodiment, the first and second transmission layers 251 and 252 having different media are formed in the transmission part 25, thereby refracting and diffusing the light projected from the diffusion part 24 at more diverse angles.

The optical imaging part 254 is plated or deposited with a metal material, thereby diffusing the light more aesthetically. The optical imaging part 254 is formed oblique to the forward direction of the display device 2, thereby diffusing the light in the direction of a viewer. Accordingly, the viewer can easily perceive the operating state of the display device 2.

Figure 11:
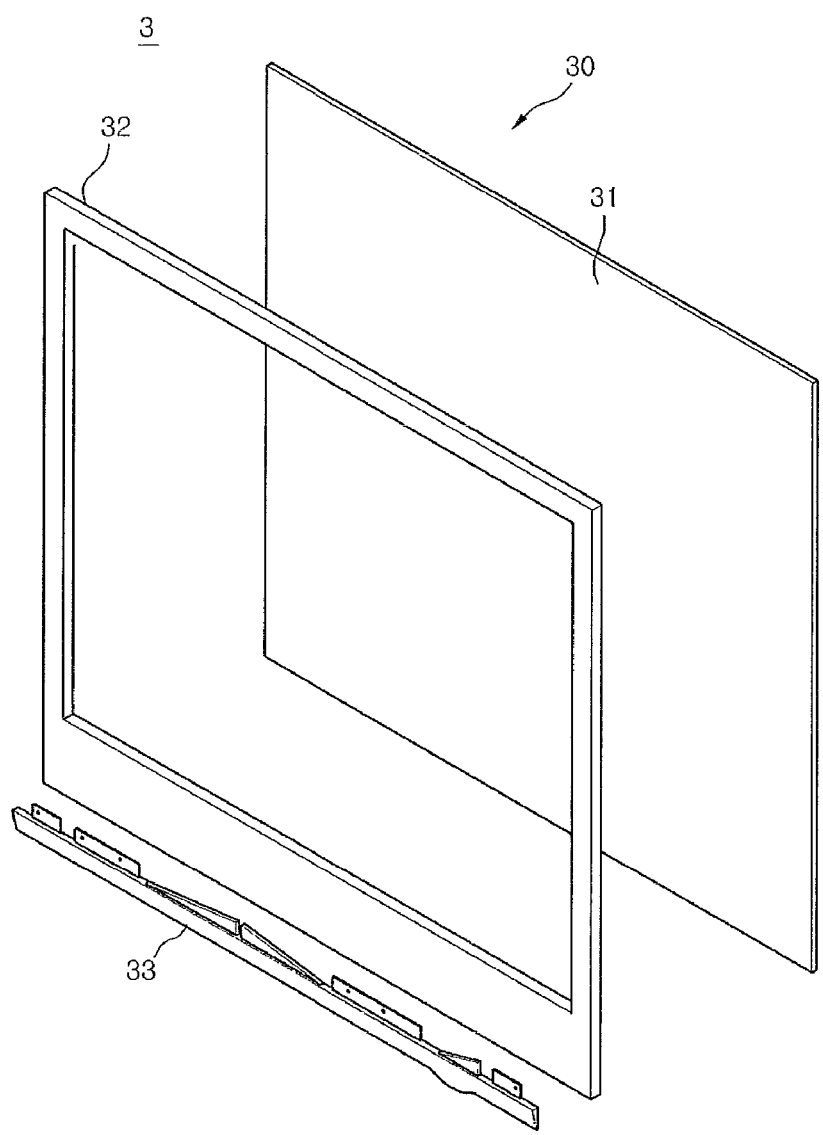
FIG. 11 is an exploded perspective view of a display device according to a third embodiment.

FIG. 11 is an exploded perspective view of a display device according to a third embodiment.

The configuration of the third embodiment is identical to that of the first embodiment, except that the configurations of front cabinets and deco frames are different from each other. Accordingly, only featured parts of the third embodiment will be described hereinafter.

Referring to FIG. 11, a display device 3 includes a display main body 30, light sources 38 and 39 (refer to FIGS. 15 and 16), and a deco frame 33. The display main body 30 includes a front panel 31, a panel fixing part 32, a display module (not shown), and a rear cabinet (not shown). The light sources 38 and 39 emit light according to the operating state of the display main body 30. The deco frame 33 is provided under the display main body 30, and transmits light generated from the light sources 38 and 39.

Hereinafter, detailed configuration of the deco frame 33 will be described.

Figure 12:
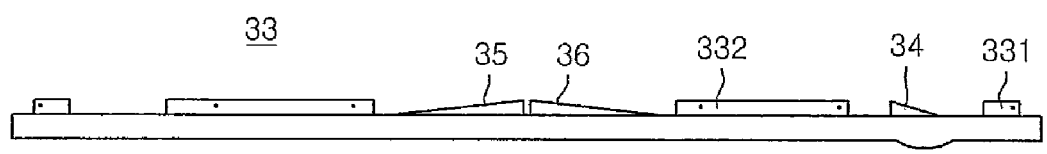
FIGS. 12 and 13 are front and rear views of a deco frame according to the third embodiment.
Figure 13:
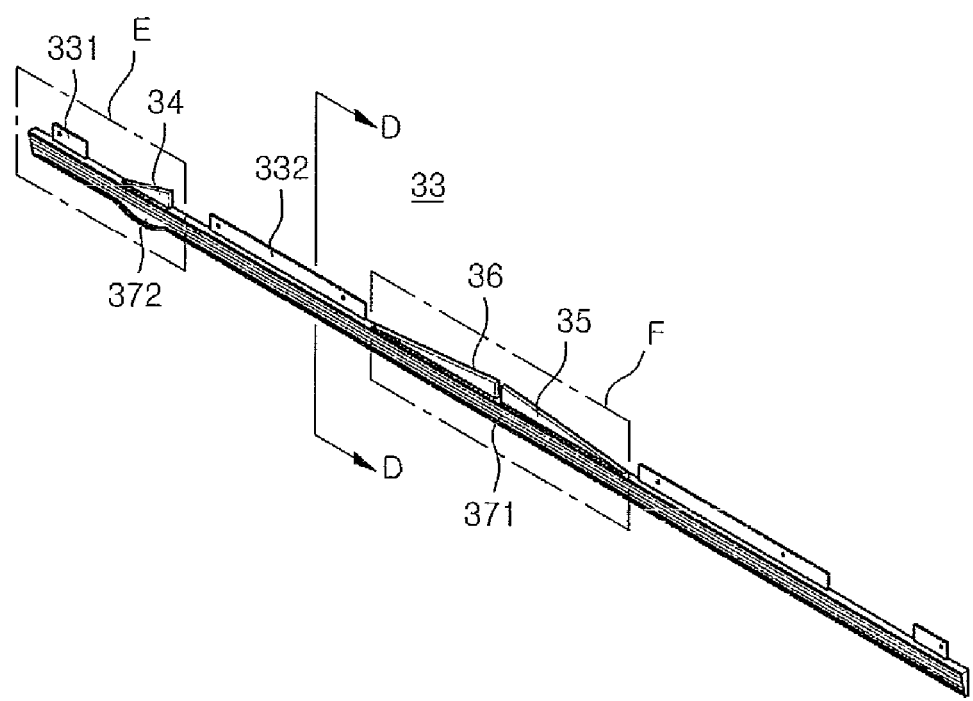
Figure 14:
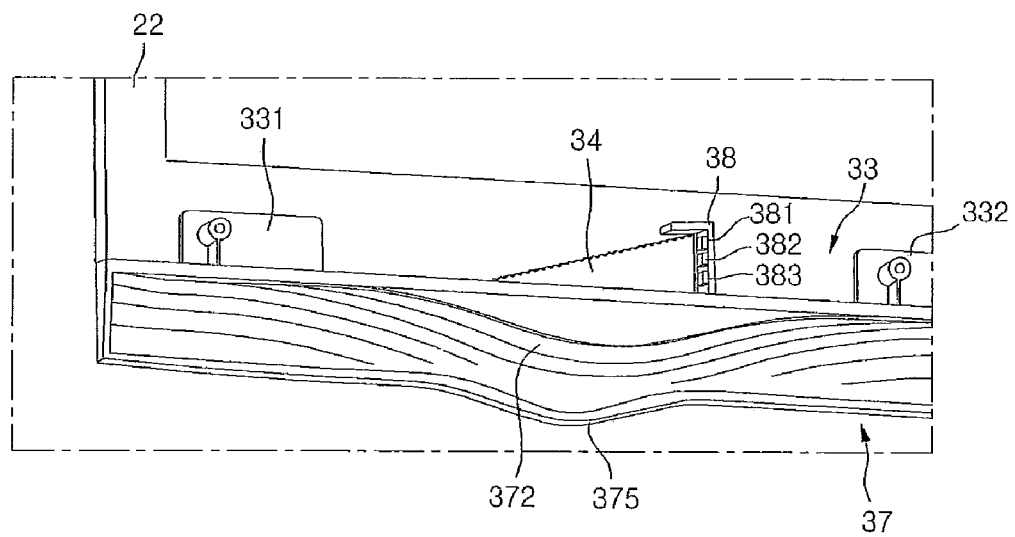
FIGS. 14 and 15 are magnified views of regions "E" and "F" of FIG. 13 when the deco frame according to the third embodiment is fixed to a front cabinet.
Figure 15:
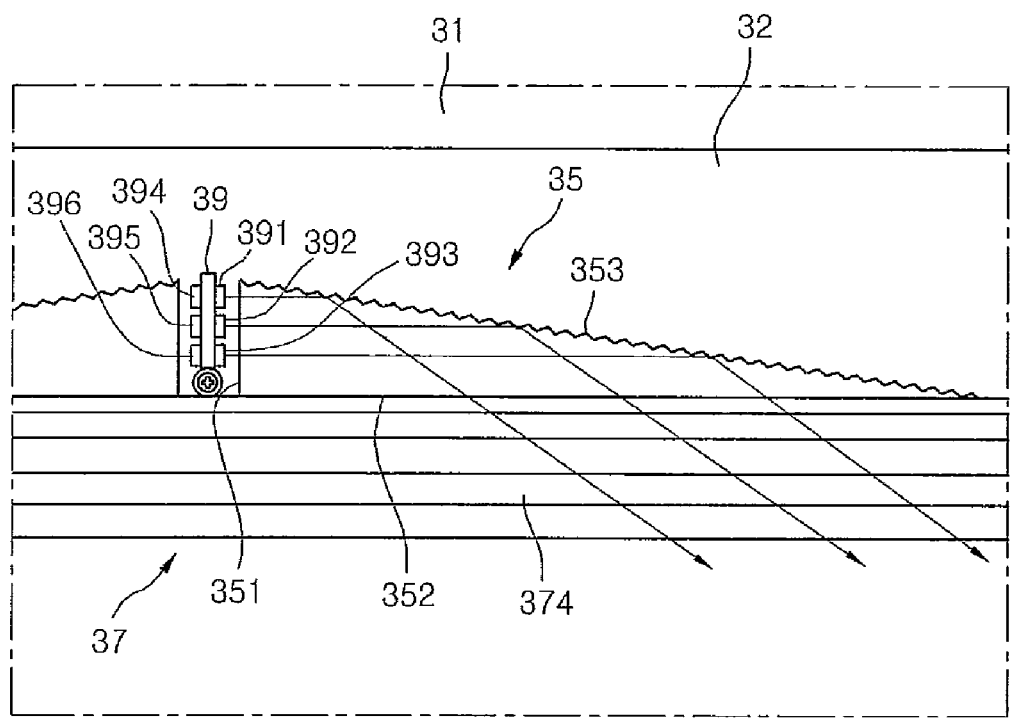
Figure 16:
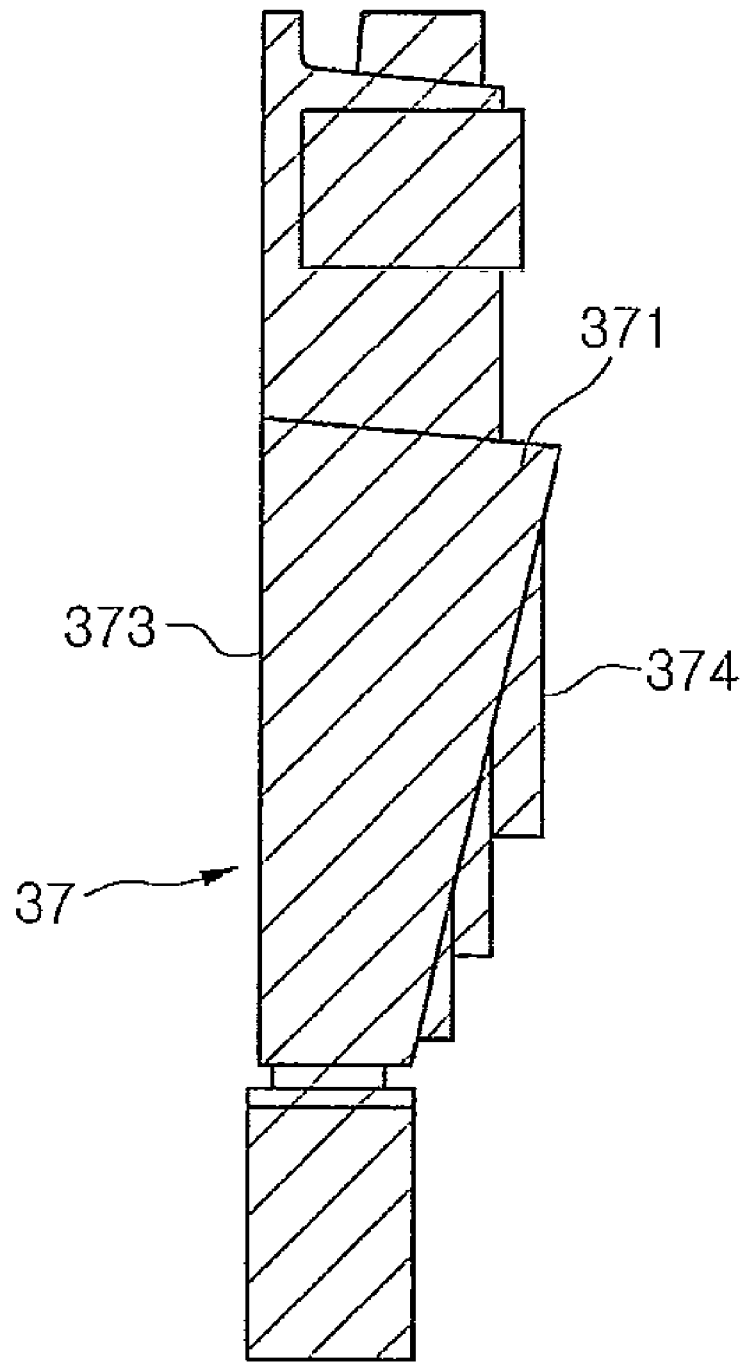
FIG. 16 is a cross-sectional view of the deco frame taken along line D-D of FIG. 13.

FIGS. 12 and 13 are front and rear views of a deco frame according to the third embodiment. FIGS. 14 and 15 are magnified views of regions "E" and "F" of FIG. 13 when the deco frame according to the third embodiment is fixed to a front cabinet. FIG. 16 is a cross-sectional view of the deco frame taken along line D-D of FIG. 13.

Referring to FIGS. 12 and 13, the deco frame 33 is formed to have a length corresponding to the horizontal length of the front panel 31.

The deco frame 33 includes a power diffusion part 34 and central diffusion parts 35 and 36, a transmission part 37, and fixing parts 331 and 332. The power diffusion part 34 and the central diffusion parts 35 and 36 diffuse and reflect light generated from the light sources 38 and 39. The transmission part 37 is provided under the diffusion parts 34, 35 and 36, and is integrally formed with the diffusion parts 34, 35 and 36. The fixing parts 331 and 332 are fixed to the inside of the display main body 30.

Referring to FIGS. 12 through 15, if the deco frame 33 is coupled to the display main body 30, then the power diffusion part 34 is located adjacent to the power switch of the display main body 30, and the central diffusion parts 35 and 36 are located at the center of the display main body 30. The central diffusion parts 35 and 36 include a first central diffusion part and a second central diffusion part 36 that are disposed obliquely in opposite directions to each other.

The first central diffusion part 35 is located opposite to the power diffusion part 34 around the center of the display main body 30, and the second central diffusion part 36 is located adjacent to the power diffusion part 34.

The first light source 38 is located adjacent to the power diffusion part 34, and the second light source 39 is located between the first central diffusion part 35 and the second central diffusion part 36, irradiating light to the diffusion parts 34, 35 and 36.

The first light source 38 includes first to third power light emitting devices 381 to 383 that are disposed perpendicular to the deco frame 33. The first to third power light emitting devices 381 to 383 may emit different colors. For example, the first and third power light emitting devices 381 and 383 may be light emitting devices emitting white light, and the second power light emitting device 382 between the first and third power light emitting devices 381 and 383 may be a light emitting device emitting red light.

The second light source 39 includes first to third central light emitting devices 391 to 393 provided on one surface of the second light source 39 and facing an incident surface 351 of the first central diffusion part 35, and fourth to sixth central light emitting devices 394 to 396 provided on the other surface of the second light source 39 and facing an incident surface of the second central diffusion part 36.

The first to third central light emitting devices 391 to 393 and the fourth to sixth central light emitting devices 394 to 396 are sequentially disposed in the perpendicular direction to the deco frame 33, respectively.

Referring to FIGS. 13 and 16, the transmission part 37 is exposed to the outside so that light may be diffused when the light diffused by the diffusion parts 34, 35 and 36 is downwardly transmitted.

The transmission part 37 is provided under the central diffusion parts 35 and 36, and the power diffusion part 34, and includes a central transmission part 371 and a power transmission part 372 that transmit the light diffused by the diffusion parts 34, 35 and 36, respectively. The central transmission part 371 is longitudinally formed in the extending direction of the transmission part 37, and the power transmission part 372 is integrally formed with the central transmission part 371 and projects in a downward curve.

A front surface part 373 and a rear surface part 374 are formed on the central transmission part 371 and the power transmission part 372. The rear surface part 374 is formed sloped in the forward direction toward the lower part thereof, and a plurality of steps is formed on the rear face part 374. The front surface part 373 is formed in a different vertical direction, with a uniform surface without a step or an inclination. In this case, the steps formed in the power transmission part 372 are formed to be downwardly curved in accordance with the curved shape of the power transmission part 372.

An optical imaging part 375 may be formed at the end of the transmission part 37 under the central transmission part 371 and the power transmission part 372 to diffuse and image light transmitted through the transmission part 37. For example, the optical imaging part 375 may have an uneven surface, or may be coated with a metal material.

Hereinafter, a process in which light generated in the light emitting device of the light source is transmitted to the transmission part through the diffusion part will be described in detail.

Referring again to FIG. 15, for example, when the first to third central light emitting devices 391 to 393 irradiate light to the first central diffusion part 35, light generated in the first central light emitting device 391 is reflected by the reflective surface 353 and transmitted to the transmission part 37 after the light travels the shortest distance from the second light source 39. The point where the light generated in the first central light emitting device 391 is incident through the transmission part 37 is formed at the most adjacent point to the second light source 39.

On the other hand, light generated in the third central light emitting device 393 at the lowest side of the second light source 39 is reflected by the reflective surface 353 and transmitted to the transmission part 37 after the light travels the longest distance from the second light source 39. The point where the light generated in the third central light emitting device 393 is incident through the transmission part 37 is formed at the most distant point from the second light source 39.

That is, the points where the light generated in the light emitting devices is incident are formed differently according to the positions of the light emitting devices.

When the light is transmitted to the transmission part via the first central diffusion part 35, a portion of the light transmitted through the transmission part 37 contacts the plurality of steps formed on the rear surface part 374 of the transmission part 37. The light contacting the steps is diffused to the outside, and is imaged on the steps during the diffusion. An optical imaging part 375 having an uneven surface may further be formed in the end of the transmission part 37 and the steps. When light is incident to the optical imaging part 375, the scattering rate causing the imaging may further be increased.

Hereinafter, a process in which the position of light projected on the optical imaging part changes according to the operation of the display main body 30 will be described.

Figure 17:
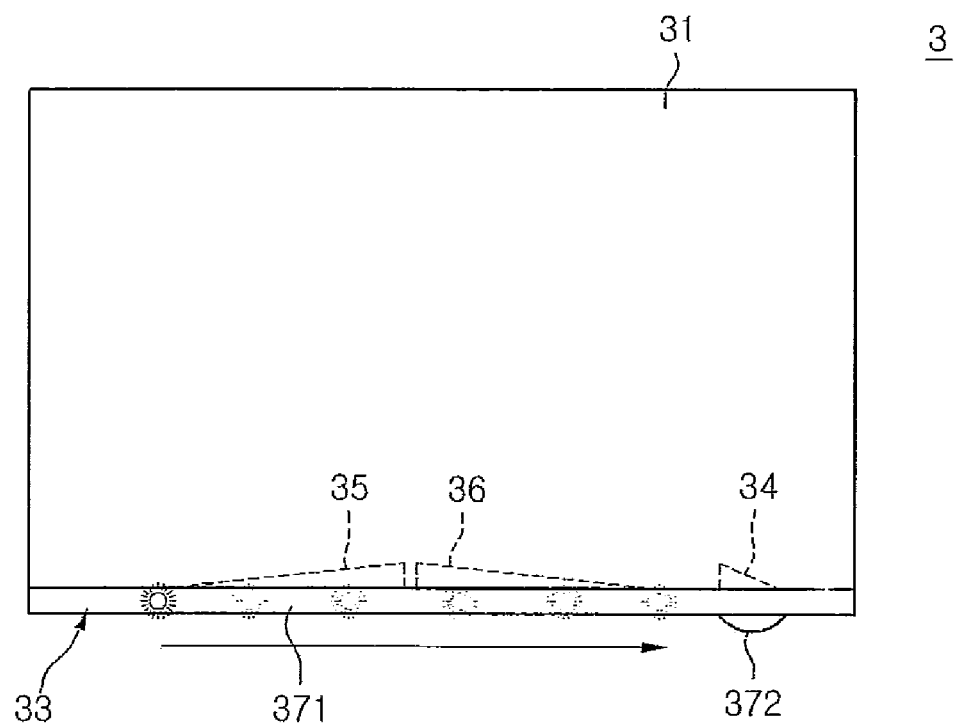
FIGS. 17 and 18 are views illustrating a position where light is projected based on an operating state of the display device according to the third embodiment.
Figure 18:
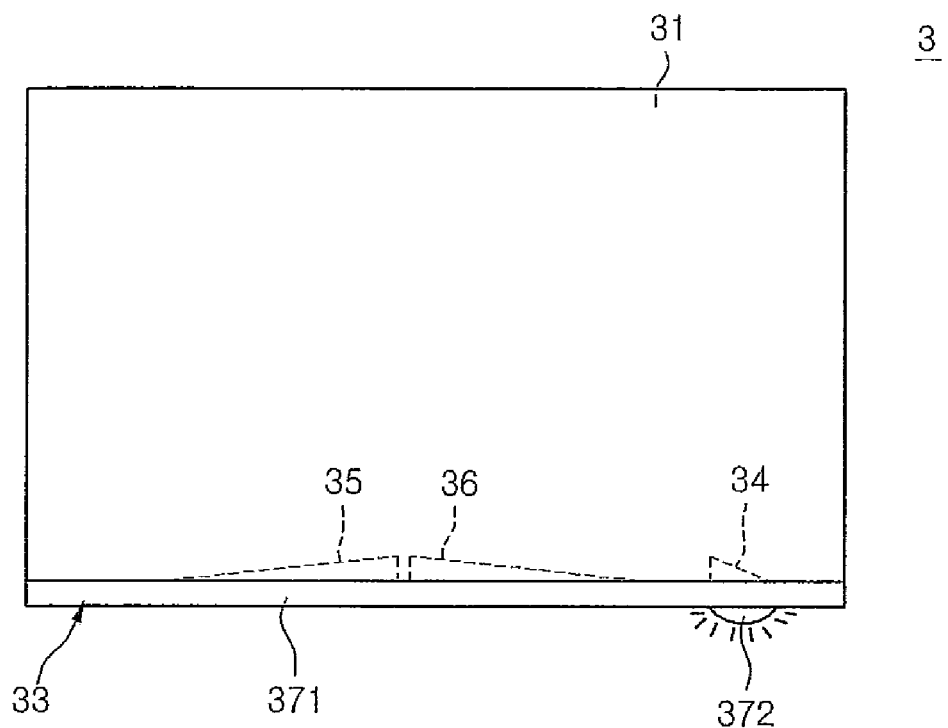

FIGS. 17 and 18 are views illustrating a position where light is projected changed based on an operating state of the display device according to the third embodiment.

Referring to FIGS. 17 and 18, if the display main body 20 is powered on and starts to operate, light is projected on the deco frame 33 at the most distant point from the power diffusion part 34.

That is, if the third central light emitting device 393 of the second light source 39 is allowed to emit light, light generated in the third central light emitting device 393 is incident and diffused to the first central diffusion part 35 and scattered at the most distant point of the central transmission part 371 from the second light source 39. That is, light is projected on the most distant point from the second light source 39.

If the second central light emitting device 392 is allowed to emit light and the third central light emitting device 393 is turned off, light generated in the second central light emitting device 392 is projected on a point more adjacent to the second light source 39 than that from the third central light emitting device 393.

If the first central light emitting device 391 is allowed to emit light and the second central light emitting device 392 is turned off, light generated in the first central light emitting device 391 is projected on a point more adjacent to the second light source 39 than that from the second central light emitting device 392.

Next, the first central light emitting device 391 is turned off, and the fourth central light emitting device 394 on the other side of the second light source 39 is allowed to emit light. If the fourth central light emitting device 394 is allowed to emit light, light generated in the fourth central light emitting device 394 is projected on a point opposite to the point where the light of the first central light emitting device 391 is projected, with respect to the second light source 39.

If the fifth and sixth central light emitting devices 395 and 396 are turned on and off in temporal sequence, a point where light is projected at the central transmission part 371 moves away from the second light source 39 toward the power diffusion part 34.

If the sixth central light emitting device 396 is turned off, the first and third power light emitting devices 381 and 383 of the first light source 38 are allowed to emit light, projecting the light on the power transmission part 372.

If the display main body 30 is turned off and set to standby, the first and third power light emitting devices 381 and 383 are turned off. In this case, the second power light emitting device 382 having a different color from the first and third power light emitting devices 381 and 383 is turned on to indicate the standby state of the display device 3.

That is, a point on the optical imaging part 375 and the steps where light is projected is moved from one point to another according to time during operation of the display main body 30.

In this case, the intensity of light projected on a point of the optical imaging part 375 and the steps is decreased as the point becomes distant from the first and second light sources 38 and 39, and is increased as the point becomes closer to the first and second light sources 38 and 39.

The projection of the light on the deco frame 33 may be performed between a time when the display main body 30 starts to operate and a time when a screen is displayed.

In this embodiment, although, by sequentially controlling the first and second light sources 38 and 39, the point where light is projected is moved, a time and a point at which light generated in a light emitting device is projected may be varied with a medium and the length of the medium through which the light is transmitted. Accordingly, the point where light is projected may be configured to vary non-sequentially, for example, by simultaneously allowing the light emitting devices of the first and second light sources 38 and 39 to emit light.

That is, if the light emitting devices of the first and second light sources 38 and 39 are simultaneously turned on, the point where light is projected is moved from one portion of the optical imaging part 375 and the steps adjacent to the first and second light sources 38 and 39 to another portion spaced from the first and second light sources 38 and 39.

In this case, the time when the projected point on the optical imaging part 375 and the steps is changed is affected by the inclination of the reflective surface 353. The smaller the inclination angle of the reflective surface 353 is, the more the time increases. That is, as the inclination of the reflective surface 353 decreases, the moving speed of the point where light is projected is reduced.

In this embodiment, the plurality of light emitting devices are not directly disposed along a path where light is projected, but are integrated into a certain point of the display device, thereby facilitating the internal design of the display device.

Also, by projecting light to the outside of the display device through reflection, refraction, and scattering of light, the projection of the light on the optical imaging part may be naturally performed.

Furthermore, the power consumption and the number of the light emitting devices may be more efficiently reduced by projecting light of the light emitting devices to the transmission part through reflection and diffusion of the light, rather than disposing light emitting devices along the projected path of the light.

Figure 19:
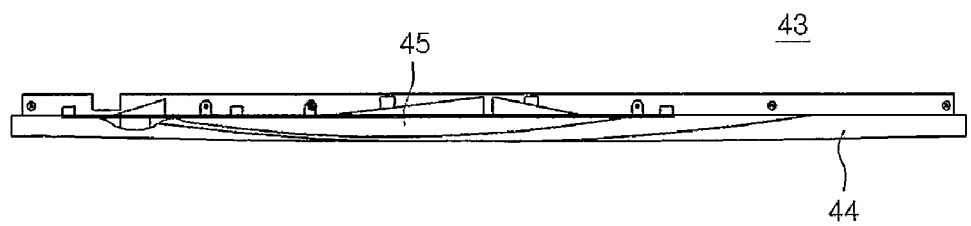
FIG. 19 is a rear view of a deco frame according to a fourth embodiment.
Figure 20:
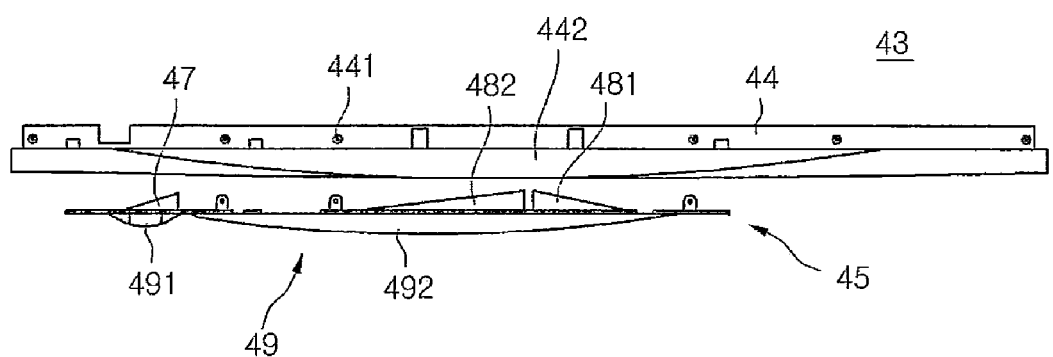
FIG. 20 is an exploded view of a deco frame according to the fourth embodiment.

FIG. 19 is a rear view of a deco frame according to a fourth embodiment. FIG. 20 is an exploded view of a deco frame according to the fourth embodiment.

The configuration of the fourth embodiment is identical to that of the third embodiment, except that the configurations of deco frames are different from each other. Accordingly, only featured parts of the fourth embodiment will be described hereinafter.

Referring to FIGS. 19 and 20, the deco frame 43 includes a first deco frame 44 constituting the outer appearance of the deco frame 43, and a second deco frame 45 fixed to the first deco frame 44.

As an example, the first deco frame 44 may be formed of a light-transmissive material having certain brightness, and the second deco frame 45 may be formed of a light-transmissive material having a softer brightness than the first deco frame 44.

The first deco frame 44 is formed to have a length corresponding to a length of the lower side of a display main body (not shown). A fixing part 441 is formed in the first deco frame 44 to fix the second deco frame 45. Also, a curved part 442 having a greater size than a central transmission part 492 of the second deco frame 44 is formed in the first deco frame 44.

The second deco frame 45 includes a power diffusion part 47, central diffusion parts 481 and 482, and a transmission part 49. The central diffusion parts 481 and 482 include a first central diffusion part 481 and a second central diffusion part 482 having a greater length than the first central diffusion part 481. That is, a projection surface of the first central diffusion part 481 is formed to have a shorter length than that of the second central diffusion part 482.

Detailed descriptions of the power diffusion part 47 and the central diffusion part 481 and 482 identical to those of the third embodiment will be omitted.

The transmission part 49 includes a power transmission part 491 downwardly protruded from the power diffusion part 47, and a central transmission part 492 downwardly protruded from the central diffusion parts 481 and 482.

The center of curvature of the central transmission part 492 is located closer to the second central diffusion part 482 having a longer length than the first central diffusion part 481, with respect to the centers of the first central diffusion part 481 and the second central diffusion part 482. That is, the central transmission part 492 is asymmetrical with respect to the center of the central diffusion parts 481 and 482. The central transmission part 492 is located in the curved part 442 when the second deco frame 45 is fixed to the first deco frame 46.

Also, uneven surfaces or optical imaging parts deposited or coated with a metal material may be formed on the edges of the power transmission part 491 and the central transmission part 492.

When the deco frame 44 is provided in the display device, the first deco frame 44 forms a front surface of the deco frame 44. Also, since the first deco frame 44 is formed of a light-transmissive material, the power transmission part 491 and the central transmission part 492 may be exposed to the front surface of the display device through one side of the first deco frame 44 and the curved part 442.

Since the configuration of light projected through the diffusion parts and the transmission parts, and movement of a point where light is projected are identical to those of the third embodiment, detailed description thereof will be omitted.

In this embodiment, there is an advantage in that the point where light is projected is moved along the curved shape of the transmission part, allowing the display device to be elegantly designed.

Since the light is incident to the incident surface having a relatively small area, and is outwardly refracted and diffused to the outside through the projection surface and the transmission part, this embodiment has an advantage a small amount of light emitting devices can be used to irradiate light on a broad area.

As the diffusion part reflects and projects incident light to the projection part, there is an advantage in that the internal design of the display main body is not restricted to the direction of light emitted from the light source.

The plurality of light emitting devices are not directly disposed along a path where light is projected, but are integrated into a certain point of the display device, thereby facilitating the internal design of the display device.

Also, by projecting light to the outside of the display device through reflection, refraction, and scattering of light, the projection of the light on the optical imaging part may be naturally performed.

Furthermore, power consumption and the number of light emitting devices may be reduced by projecting light of the light emitting devices to the transmission part through reflection and diffusion of the light, rather than disposing light emitting devices along the projected path of the light.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display main body comprising a display module and a cabinet protecting the display module;
   a light source generating light according to an operating state of the display main body;
   a diffusion part to which the light from the light source is incident, and comprising a reflective surface oblique to an incident direction of the light; and
   a transmission part disposed at a side of the diffusion part, and comprising an optical imaging part providing a predetermined region through which the light that is diffused from the diffusion part is projected, the transmission part transmitting the light externally,
   wherein the region of the optical imaging part through which the light is projected is moved from one point to another point of the optical imaging part according to time.

2. The display device according to claim 1, wherein the diffusion part is provided in the display main body.

3. The display device according to claim 1, wherein the diffusion part further comprises:
   an incident surface to which the light generated in the light source is incident; and
   a projection surface disposed in a direction crossing the incident surface, and through which the light reflected by the reflective surface is transmitted.

4. The display device according to claim 3, wherein the incident surface is smaller in size than the projection surface, and the incident surface and the projection surface are disposed perpendicular to each other.

5. The display device according to claim 3, wherein one edge of the incident surface is contacted with one edge of the projection surface, an opposite edge of the incident surface is contacted with one edge of the reflective surface, and an opposite edge of the projection surface is contacted with an opposite edge of the reflective surface.

6. The display device according to claim 1, wherein the reflective surface comprises a plurality of grooves.

7. The display device according to claim 1, wherein the optical imaging part is formed of a metal material, or is tilted at a predetermined angle toward a front of the display main body.

8. The display device according to claim 1, wherein the transmission part comprises first and second transmission layers that are formed of different media, respectively, the first and second transmission layers being disposed in a direction crossing a direction of the light projected from the diffusion part.

9. The display device according to claim 1, wherein the transmission part comprises steps perpendicular to a direction in which the light is transmitted within the transmission part, the steps having light projected thereon.

10. The display device according to claim 1, wherein the light source is located at a side of the diffusion part and irradiates light on a side surface of the diffusion part, and the light irradiated on the diffusion part is transmitted through the transmission part disposed at a bottom of the diffusion part and is transmitted downward of the display main body.

11. The display device according to claim 1, wherein the portion of the optical imaging part on which the light is projected is moved in a direction away from the light source.

12. The display device according to claim 1, wherein a time when the portion on which the light is projected is changed from one point to another point of the optical imaging part is extended as an inclination of the reflective surface is reduced.

13. The display device according to claim 1, wherein a color and intensity of the light generated in the light source are regulated according to the operating state of the display device.

14. The display device according to claim 1, wherein the light source comprises a plurality of light emitting devices sequentially or non-sequentially operating according to the operating state of the display device.

* * * * *